(12) United States Patent
Takahashi

(10) Patent No.: US 11,422,685 B2
(45) Date of Patent: Aug. 23, 2022

(54) INPUT MODE-SENSITIVE USER INTERFACE TECHNIQUES AND DEVICE

(71) Applicant: BROTHER KOGYO KABUSHIKI KAISHA, Nagoya (JP)

(72) Inventor: Yusaku Takahashi, Kariya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 1119 days.

(21) Appl. No.: 14/447,716

(22) Filed: Jul. 31, 2014

(65) Prior Publication Data

US 2015/0040044 A1    Feb. 5, 2015

(30) Foreign Application Priority Data

Jul. 31, 2013  (JP) .............................. JP2013-158916

(51) Int. Cl.
  *G06F 3/04842* (2022.01)
  *G06F 3/0481* (2022.01)
  *G06F 3/04886* (2022.01)

(52) U.S. Cl.
  CPC ........ *G06F 3/04842* (2013.01); *G06F 3/0481* (2013.01); *G06F 3/04886* (2013.01)

(58) Field of Classification Search
  CPC combination set(s) only.
  See application file for complete search history.

(56) References Cited

U.S. PATENT DOCUMENTS

| 6,029,214 A * | 2/2000 | Dorfman ............. G06F 3/03545 345/173 |
| 2004/0150668 A1 | 8/2004 | Myers et al. |
| 2005/0024322 A1* | 2/2005 | Kupka .................. G06F 3/0231 345/156 |

(Continued)

FOREIGN PATENT DOCUMENTS

| JP | 9-153042 A | 6/1997 |
| JP | 2000-47822 A | 2/2000 |

(Continued)

OTHER PUBLICATIONS

Laura Acklen, "Absolute Beginner's Guide to Microsoft Office Word 2003" (2003).*

(Continued)

*Primary Examiner* — James T Tsai
(74) *Attorney, Agent, or Firm* — Merchant & Gould P.C.

(57) ABSTRACT

A first selection of an image may be received in accordance with image selection information inputted from a pointing device. A second selection of an image corresponding to a designated coordinate may be received by detecting the designated coordinate. A first object image for receiving an instruction to display a plurality of first images may be displayed. The plurality of first images may be displayed when an operation to select the displayed first object image is received in the first selection or the second selection. When a selection of a first image is received, the process associated with the selected first image may be executed. The plurality of first images may be displayed in a first mode (Continued)

when the operation is received in the first selection. The plurality of first images may be displayed in a second mode when the operation is received in the second selection.

16 Claims, 8 Drawing Sheets

(56) References Cited

U.S. PATENT DOCUMENTS

| | | | | |
|---|---|---|---|---|
| 2006/0077183 | A1* | 4/2006 | Studt | G06F 3/0416 |
| | | | | 345/173 |
| 2006/0244735 | A1* | 11/2006 | Wilson | G06F 3/0488 |
| | | | | 345/173 |
| 2006/0290658 | A1 | 12/2006 | Konuma et al. | |
| 2009/0284488 | A1* | 11/2009 | Sip | G06F 3/04883 |
| | | | | 345/173 |
| 2011/0164062 | A1 | 7/2011 | Nakamura et al. | |
| 2011/0169753 | A1* | 7/2011 | Shimamura | G06F 3/0486 |
| | | | | 345/173 |
| 2011/0185300 | A1 | 7/2011 | Hinckley et al. | |
| 2012/0054671 | A1* | 3/2012 | Thompson | G06F 3/038 |
| | | | | 715/784 |
| 2012/0162093 | A1* | 6/2012 | Buxton | G06F 3/0482 |
| | | | | 345/173 |
| 2012/0249445 | A1* | 10/2012 | Suzuki | G06F 1/1616 |
| | | | | 345/173 |
| 2013/0132904 | A1* | 5/2013 | Primiani | G06F 3/04886 |
| | | | | 715/834 |
| 2013/0187856 | A1 | 7/2013 | Konno et al. | |
| 2013/0191779 | A1* | 7/2013 | Radakovitz | G06F 3/0488 |
| | | | | 715/800 |
| 2013/0238989 | A1* | 9/2013 | Chu | G06F 17/30867 |
| | | | | 715/273 |
| 2013/0290903 | A1* | 10/2013 | DeMaio | G06F 3/0482 |
| | | | | 715/825 |
| 2013/0326430 | A1* | 12/2013 | Devi | G06F 3/0488 |
| | | | | 715/863 |
| 2014/0002398 | A1* | 1/2014 | Bao | G06F 3/0414 |
| | | | | 345/173 |
| 2014/0282271 | A1* | 9/2014 | Lu | G06F 3/017 |
| | | | | 715/863 |
| 2014/0327626 | A1* | 11/2014 | Harrison | G06F 3/0416 |
| | | | | 345/173 |
| 2014/0354554 | A1* | 12/2014 | Devi | G06F 3/0488 |
| | | | | 345/173 |
| 2014/0368421 | A1* | 12/2014 | Smus | G06F 3/038 |
| | | | | 345/156 |
| 2015/0095828 | A1* | 4/2015 | Iida | G06F 3/04883 |
| | | | | 715/771 |

FOREIGN PATENT DOCUMENTS

| | | |
|---|---|---|
| JP | 2002-342320 A | 11/2002 |
| JP | 2004-234661 A | 8/2004 |
| JP | 2005-202887 A | 7/2005 |
| JP | 2007-011459 A | 1/2007 |
| JP | 2010-067139 A | 3/2010 |
| JP | 2010-176568 A | 8/2010 |
| JP | 2011-257887 A | 12/2011 |
| WO | 2012/049899 A1 | 4/2012 |
| WO | 2012/127792 A1 | 9/2012 |

OTHER PUBLICATIONS

Vogel, Daniel. "Shift: A Technique for Operating Pen-Based Interfaces Using Touch," ACM CHI 2007, Apr. 28-May 3, 2007, San Jose, California, USA.*

Japanese Office Action from corresponding Japanese Patent Application No. 2013-158916, dated Jan. 31, 2017.

Tettei kouryaku windows 98 taizen internet explorer 5 kanzen taiou-ban, Mainichi Communications Inc., Jun. 18, 1999, p. 92.

Office Action issued in corresponding Japanese Patent Application No. 2013-158916, dated Sep. 26, 2017.

Office Action (Notification of Reasons for Rejection) issued in related Japanese Patent Application 2017-249847, dated Oct. 9, 2018.

OASYS Start Guide, B4H1-0221-01-01, Fujitsu Limited, Jan. 1997, p. 126.

* cited by examiner

INPUT MODE-SENSITIVE USER INTERFACE TECHNIQUES AND DEVICE

CROSS-REFERENCE TO RELATED APPLICATIONS

This application claims priority to Japanese Patent Application No. 2013-158916, filed on Jul. 31, 2013, the contents of which are hereby incorporated by reference into the present application.

TECHNICAL FIELD

The present application relates to a non-transitory computer-readable recording medium which stores an information processing program for causing an image to be displayed on a display.

DESCRIPTION OF RELATED ART

Recently, information processing devices that are provided with a pointing device such as a mouse, etc. and provided with a touch panel display have become popular. In this type of information processing device, an input operation can be received utilizing two input systems: an input system utilizing the pointing device, and an input system utilizing the touch panel.

SUMMARY

When the input system utilizing the pointing device and the input system utilizing the touch panel are made to coexist, operability may be reduced. In the present specification, a technique is provided which can eliminate this type of inconvenience.

In one aspect of the teachings disclosed herein, a non-transitory computer-readable recording medium which stores computer-readable instructions for an information processing device may be provided. The information processing device may comprise: a processor; a pointing device; and a display. The computer-readable instructions, when executed by the processor, may cause the information processing device to display a pointer on the display in accordance with pointer position information indicating a moving direction and a moving amount of the pointer. The pointer position information may be inputted from the pointing device. The computer-readable instructions may cause the information processing device to receive a first selection of an image in accordance with image selection information inputted from the pointing device. The image selection information may indicate that the image corresponding to a displayed position of the pointer has been selected. The computer-readable instructions may cause the information processing device to perform receive a second selection of an image corresponding to a designated coordinate by detecting the designated coordinate that is a coordinate indicating a position where an indicator made contact or approached within a display region of the display. The computer-readable instructions may cause the information processing device to perform display a first object image on the display for receiving an input of an instruction to display a plurality of first images on the display. Each of the plurality of first images may have a process associated thereto. The computer-readable instructions may cause the information processing device to perform display the plurality of first images on the display in a case where an operation to select the displayed first object image is received in the first selection or the second selection. The computer-readable instructions may cause the information processing device to perform execute, in a case where a selection of a first image among the plurality of displayed first images is received, the process associated with the selected first image. The plurality of first images may be displayed in a first mode in a case where the operation to select the displayed first object image is received in the first selection. The plurality of first images may be displayed in a second mode in a case where the operation to select the displayed first object image is received in the second selection.

In another aspect of the teachings disclosed herein, a non-transitory computer-readable recording medium which stores computer-readable instructions for an information processing device may be provided. The information processing device may comprise: a processor; a pointing device; and a display. The computer-readable instructions, when executed by the processor, may cause the information processing device to display a pointer on the display in accordance with pointer position information indicating a moving direction and a moving amount of the pointer. The pointer position information may be inputted from the pointing device. The computer-readable instructions may cause the information processing device to detect a designated coordinate that is a coordinate indicating a position where an indicator made contact or approached within a display region of the display. The computer-readable instructions may cause the information processing device to display a third object image on the display for receiving inputs of various operations. The computer-readable instructions may cause the information processing device to display a plurality of second images on the display in a case where the pointer is being displayed in a displayed area of the displayed third object image. The display of the plurality of second images may be performed in accordance with the designated coordinate being detected outside of the display area of the displayed third object image. The display of the plurality of second images may be performed with the detected designated coordinate as a reference. The computer-readable instructions may cause the information processing device to execute, in a case where the designated coordinate is detected within one of displayed areas of the plurality of displayed second images, a process associated with the second image in which displayed area the designated coordinate was detected. A process may be associated with each of the plurality of second images. The processes may be various processes related to an operation of which input is received in the third object image.

In another aspect of the teachings disclosed herein, a non-transitory computer-readable recording medium which stores computer-readable instructions for an information processing device may be provided. The information processing device may comprise: a processor; a pointing device; and a display. The computer-readable instructions, when executed by the processor, may cause the information processing device to display a pointer on the display in accordance with pointer position information indicating a moving direction and a moving amount of the pointer. The pointer position information may be inputted from the pointing device. The computer-readable instructions may cause the information processing device to receive a third selection of an image or a position in accordance with selection information inputted from the pointing device. The selection information may indicate that the image or the position corresponding to the displayed position of the pointer has been selected. The computer-readable instructions may cause the information processing device to receive a fourth selection of an image or a position corresponding to a designated coordinate by detecting the designated coordinate that is a coordinate indicating a position where an indicator made contact or approached within a display region of the display. The computer-readable instructions may cause the information processing device to store a selected object image in the memory in a case where an operation to select a displayed object image is received in one of the third selection or the fourth selection. The computer-readable instructions may cause the information processing device to display the selected object image on the display, in a case where an operation to designate a specific position within a display screen displayed in the display is received in the other of the third selection or the fourth selection. The selected object image may be displayed with the specific position as a reference.

EMBODIMENTS

First Embodiment

Figure 1:
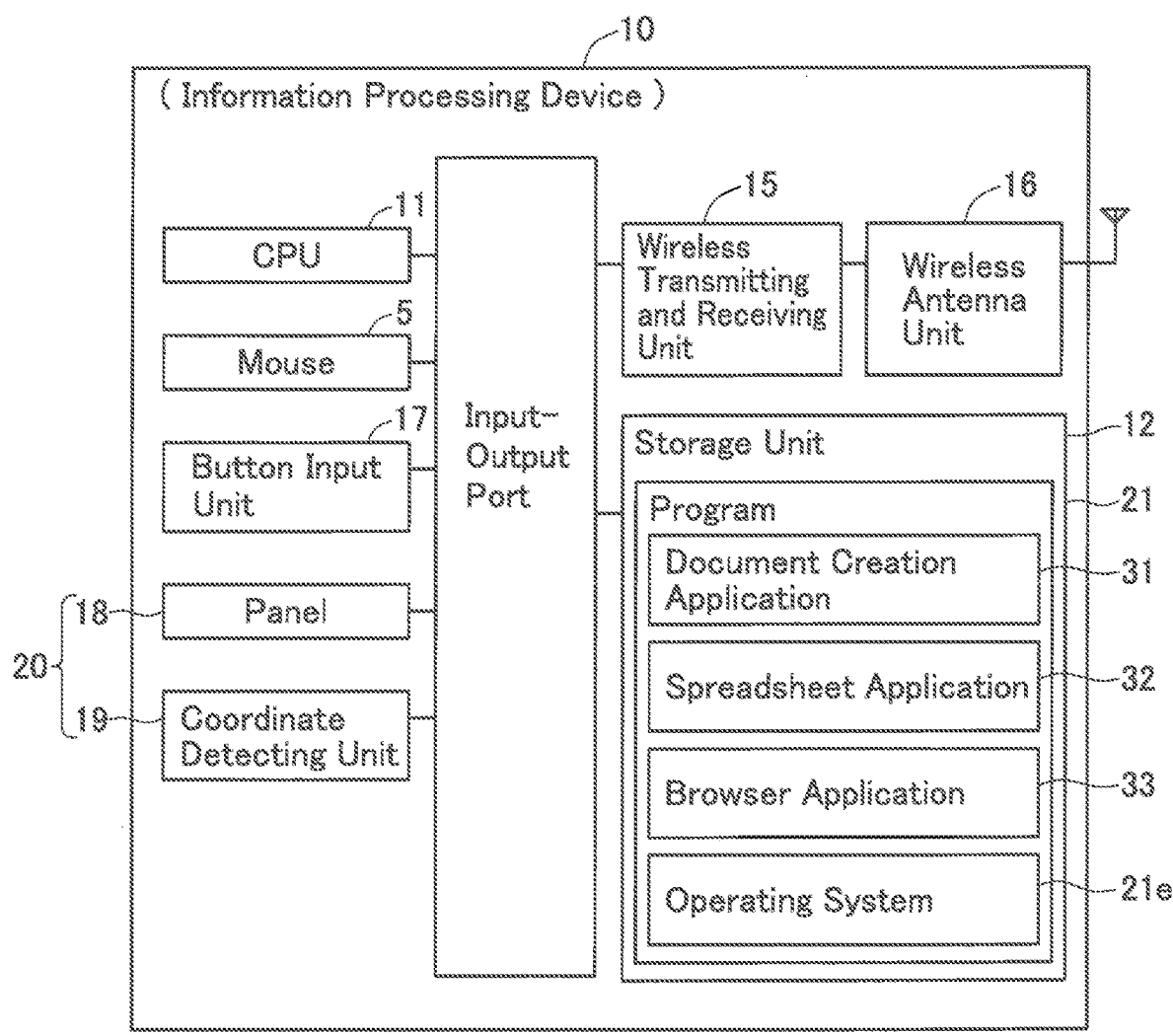
FIG. 1 is a block diagram of an information processing device.

FIG. 1 illustrates a block diagram of an information processing device 10 illustrated as the first embodiment. As illustrated in FIG. 1, the information processing device 10 chiefly comprises a mouse 5, a CPU (referred to as Central Processing Unit) 11, a storage unit 12, a wireless transmitting and receiving unit 15, a wireless antenna unit 16, a button input unit 17, a panel 18, and a coordinate detecting unit 19. One example of the information processing device 10 is a PC (referred to as Personal Computer).

The button input unit 17 receives an operation by a user of the information processing device 10. An example of the button input unit 17 is a keyboard. The panel 18 displays a variety of function information of the information processing device 10. The coordinate detecting unit 19 is a unit for detecting designated coordinates, these being coordinates indicating a position where an indicator (e.g., a fingertip of the user) is in contact with or in proximity to a display area of the panel 18. By being formed integrally with the panel 18, the coordinate detecting unit 19 functions as a touch panel 20. That is, the information processing device 10 is a device capable of receiving an input operation utilizing the two input systems: the input system utilizing the mouse 5 and the input system utilizing the touch panel 20. The coordinate detecting unit 19 is capable of simultaneously detecting a plurality of designated coordinates. The wireless transmitting and receiving unit 15 performs wireless communication which conforms to an infrastructure mode of the wireless LAN, via the wireless antenna unit 16.

The CPU 11 executes processing according to the program 21 stored in the storage unit 12. In the ensuing explanation, the CPU 11 to execute programs such as the document creation application 31 and the operating system 21e is sometimes simply referred to by the program name. For example, the indication of "the operating system 21e" may mean "the CPU 11 that executes the the operating system 21e".

The storage unit 12 is configured such that a RAM (referred to as Random Access Memory), a ROM (referred to as Read Only Memory), a flash memory, an HDD (referred to as hard disk drive), and a buffer provided in the CPU 11, etc. are combined. The storage unit 12 stores a program 21. The program 21 includes the operating system 21e, the document creation application 31, a spreadsheet application 32, and a browser application 33.

The operating system 21e is a program that provides the function of causing various images to be displayed on the panel 18, and basic functions utilized in common by the document creation application 31 and the browser application 33. Further, the operating system 21e is also a program that provides an API (referred to as Application Programming Interface) for the applications to provide instructions to various types of hardware. In the present specification, a case will be described in which Windows 8® (registered trademark of Microsoft Corporation) is utilized as the operating system 21e.

The operating system 21e causes the CPU 11 to function as a first receiving means and a second receiving means. The first receiving means causes the panel 18 to display a pointer image in accordance with pointer position information which is input from the mouse 5 and which indicates direction of movement or amount of movement of a pointer. Further, the first receiving means receives selection of an image in accordance with the input of image selection information, the image selection information being from the mouse 5, and indicating selection of an image corresponding to a display position of the pointer image. Information indicating that a left click button of the mouse 5 has been pressed is an example of the image selection information. The second receiving means detects the designated coordinates, which are coordinates indicating a position at which the indicator is in contact with or in proximity to the display area of the panel 18. Then, the selection of an image corresponding to the designated coordinates is received.

The document creation application 31 is a program for generating various document files, such as Microsoft Word® (registered trademark of Microsoft Corporation). The spreadsheet application 32 is a program for performing various calculations, such as Microsoft Excel® (registered trademark of Microsoft Corporation). The browser application 33 is a program for obtaining web page data from a web server (not shown), and causing a web page image to be displayed on the panel 18. An example of the browser application 33 is Internet Explorer® (registered trademark of Microsoft Corporation). The applications of document creation application 31 to browser application 33 can be utilized by being installed on the information processing device 10 by the user or the like.

Object image data is stored in the storage unit 12. The object image data is image data which causes an object image, which displays various types of information, to be displayed on the display unit. Examples of the object image are a button image or window image which receives the input of various commands, a keyboard image which receives the input of various character strings, etc. Further, various data, such as a mouse start flag, touch panel start flag, selected object image, etc. (to be described) is stored temporarily in the storage unit 12.

Operation of Information Processing Device

Figure 2:
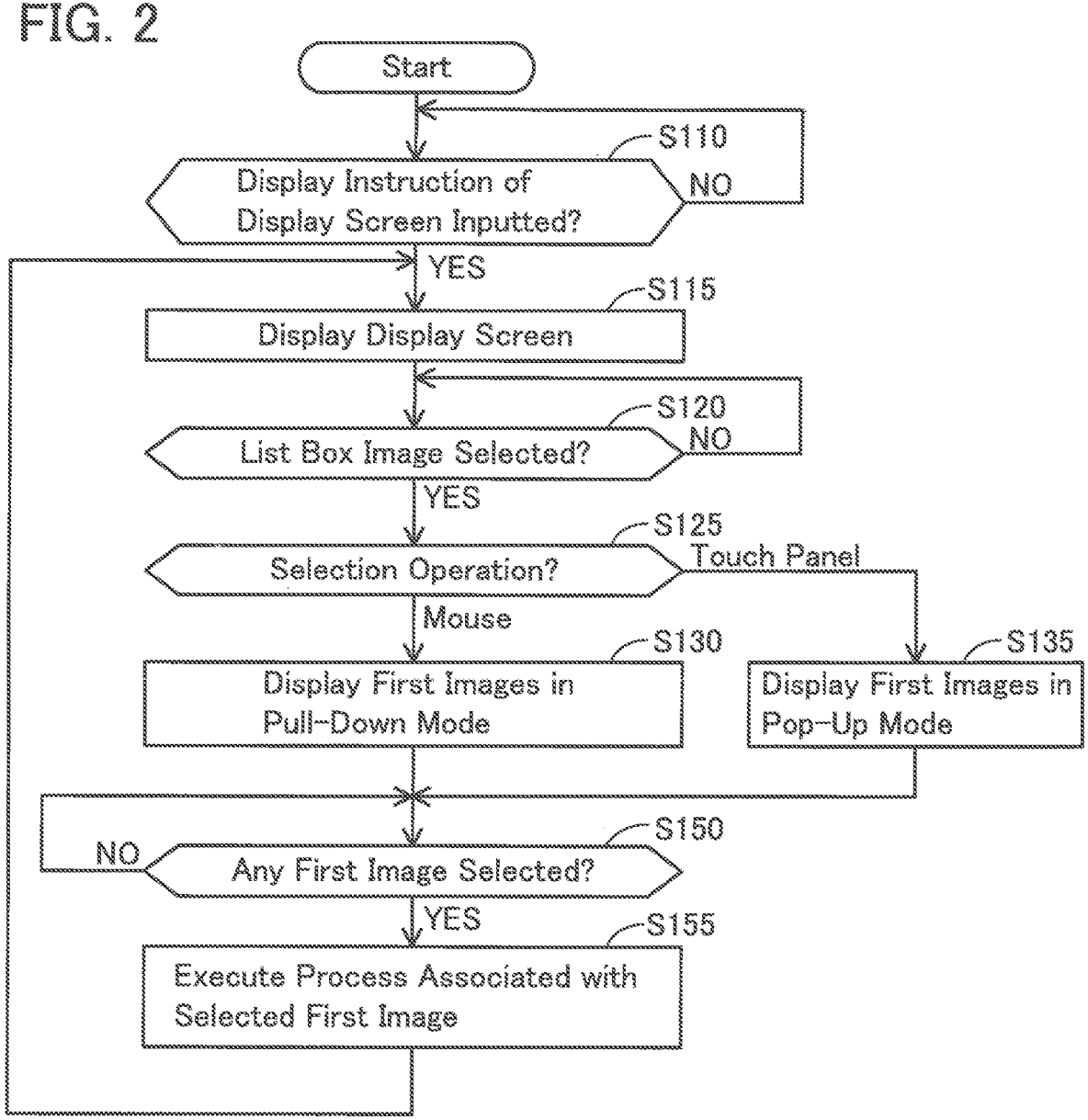
FIG. 2 is a diagram illustrating an operation flowchart of the information processing device of the first embodiment.

Operation of the information processing device 10 of the first embodiment will be described utilizing the flowchart of FIG. 2. When the user inputs an operation, via the button input unit 17, to start the information processing device 10, the CPU 11 reads the operating system 21e, and starts overall control of the information processing device 10. Thereby, the flowchart of FIG. 2 is started.

In S110, the CPU 11 determines whether a display instruction of various display screens has been input. A document creation screen may be an example of the display screen. The determination of whether a display instruction has been input may be performed according to whether a start receiving image (e.g., an icon image of an application) for receiving a start instruction of, e.g., the document creation application 31, has been selected. In case of a negative determination (S110: NO), processing returns to S110, and in case of a positive determination (S110: YES), processing proceeds to S115.

Figure 3:
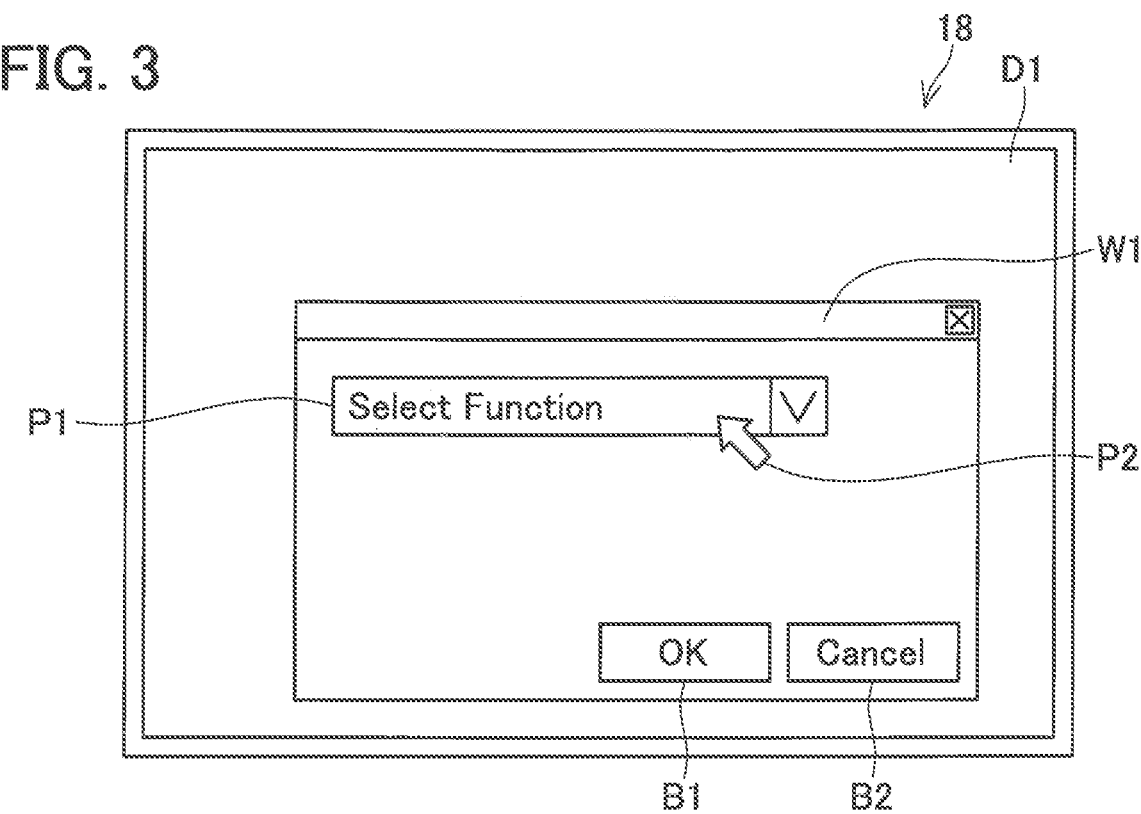
FIG. 3 is a diagram illustrating an example of a display screen.

In S115, the CPU 11 displays a display screen including various object images on the panel 18. FIG. 3 shows a display screen D1, which is an example of a display screen. A window image W1 is displayed on the display screen D1. A list box image P1, a pointer image P2, an OK button image B1, and a cancel button image B2 are included in the window image W1. The list box image P1 is an image for receiving input of an instruction to display a plurality of first images. Various processes are associated with each of the plurality of first images. When any one first image of the plurality of first images is selected, the process associated with the selected first image is performed. The pointer image P2 is an image pointing to current location input by the mouse 5. The pointer image P2 can be caused to move within the display screen D1 in accordance with the pointer position information indicating direction of movement and amount of movement input from the mouse 5. The OK button image B1 is an image for receiving an executing instruction of various processes. The cancel button image B2 is an image for receiving a cancel instruction of various processes. In the illustrative example of the first embodiment, below, operations will be described in the case of the display screen illustrated in FIG. 3 being shown.

In S120, the CPU 11 determines whether the list box image P1 has been selected. The present determination may be performed on the basis of whether either of the first receiving means or the second receiving means has received the operation for selecting the list box image P1. In case of a negative determination (S120: NO), processing returns to S120, and in case of a positive determination (S120: YES), processing proceeds to S125.

In S125, the CPU 11 determines whether the selection operation of the list box image P1 has been performed by either of the mouse 5 or the touch panel 20. In case of determining that the selection operation has been performed by the mouse 5 (S125: mouse), processing proceeds to S130. Specifically, as illustrated in FIG. 3, in case the left click button of the mouse 5 is pressed while the pointer image P2 is present in the display area of the list box image P1, thus inputting the image selection information, the CPU 11 that is functioning as the first receiving means determines that the selection operation of the list box image P1 has been performed by the mouse 5.

Figure 4:
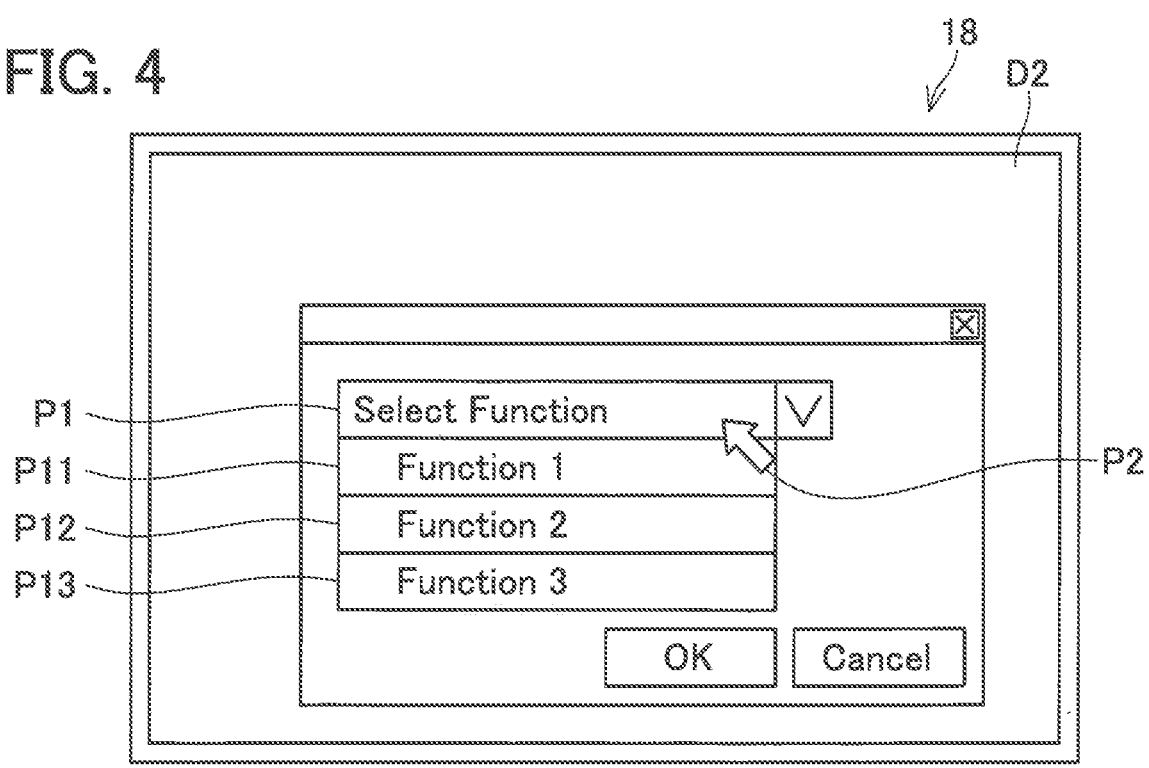
FIG. 4 is a diagram illustrating an example of a display screen.

In S130, the CPU 11 displays the plurality of first images in pull-down mode. FIG. 4 shows a display screen D2 in which a first image is displayed in pull-down mode. In the display screen D2, first images P11 to P13 are displayed hanging as if pulled out from the list box image P1. Each of the first images P11 to P13 is displayed as a choice of each of functions 1 to 3. Then, processing proceeds to S150.

Figure 5:
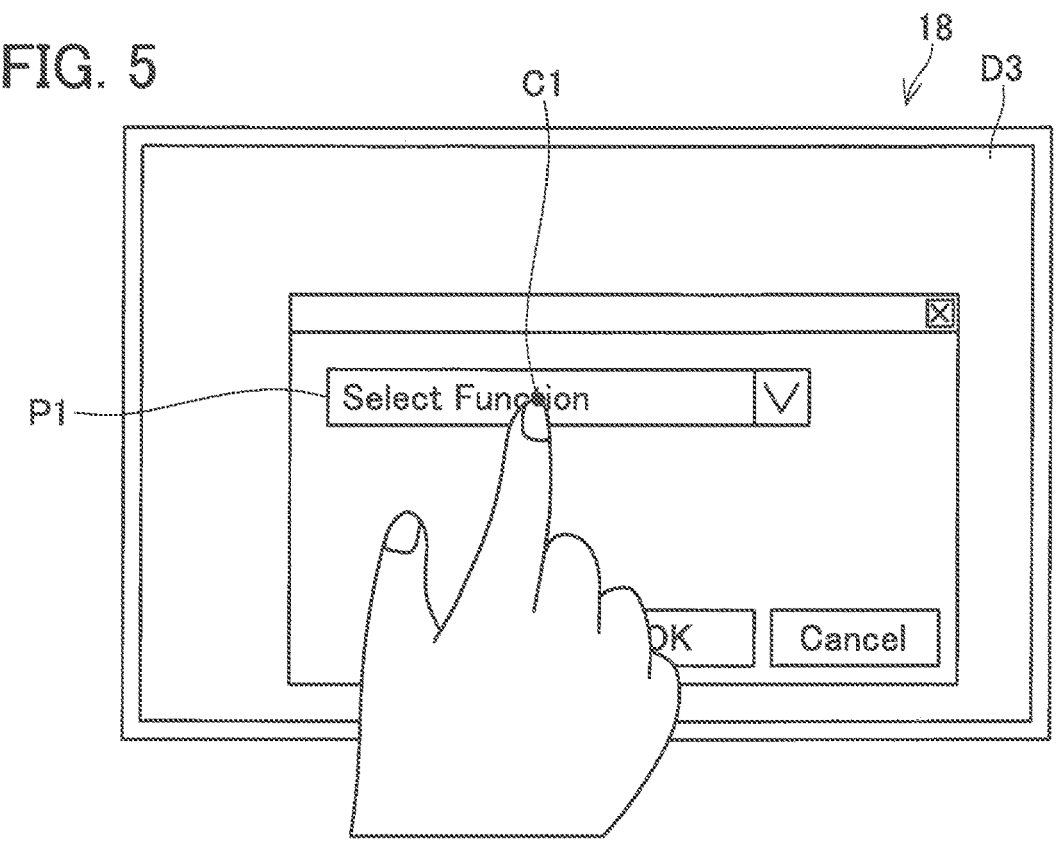
FIG. 5 is a diagram illustrating an example of a display screen.

On the other hand, in case of determining in S125 that the selection operation has been performed by the touch panel 20 (S125: touch panel), processing proceeds to S135. Specifically, as illustrated in FIG. 5, in case of detecting that designated coordinates C1 are within the display area of the list box image P1, the CPU 11 that is functioning as the second receiving means determines that the selection operation of the list box image P1 has been performed by the touch panel 20. The designated coordinates C1 are coordinates indicating a position of the fingertip of the user that is in contact with or in proximity to a surface of the panel 18.

Figure 6:
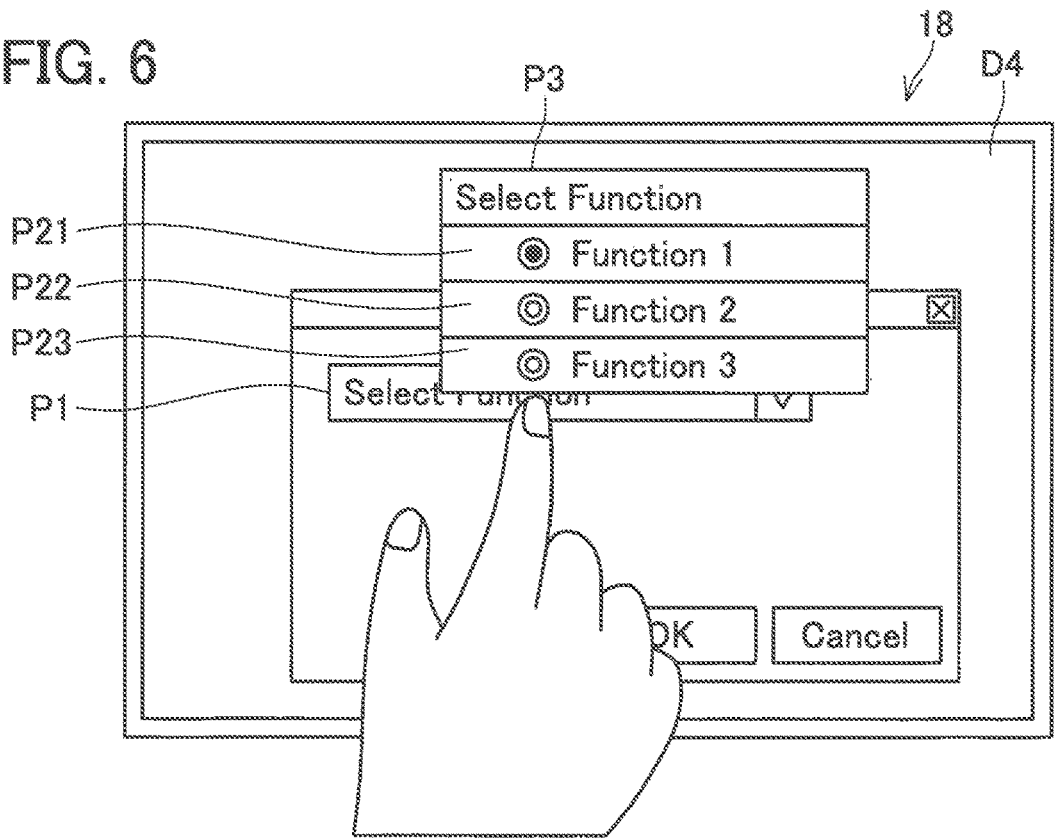
FIG. 6 is a diagram illustrating an example of a display screen.

In S135, the CPU 11 displays the plurality of first images in a pop-up mode. FIG. 6 shows a display screen D4 in which the first image is displayed in the pop-up mode. In the display screen D4, a pop-up image P3 is displayed as popping out in the vicinity of the list box image P1. The pop-up image P3 includes first images P21 to P23. Each of the first images P21 to P23 is displayed as a choice of each of the functions 1 to 3. Then, processing proceeds to S150.

In S150, the CPU 11 determines whether any first image has been selected. The present determination may be performed on the basis of whether either of the first receiving means or the second receiving means has received an operation for selecting any one first image. In case of a negative determination (S150: NO), processing returns to S150, and in case of a positive determination (S150: YES), processing proceeds to S155.

In S155, the CPU 11 executes a process associated with the selected first image. Then, processing returns to S115.

Effect of First Embodiment

In the pull-down mode, in response to selection of the list box image, the plurality of first images are displayed hanging as if pulled out from the list box image, with the list box image being a reference position. Further, in case of selecting the list box image utilizing an indicator such as a fingertip, etc., the indicator is present on the list box image at the time the list box image was selected, and consequently the vicinity of the list box image (a lower side in particular) is in a state of being physically hidden by the indicator. Thereupon, in the case where the list box image is selected utilizing the indicator, if the plurality of first images are displayed utilizing the pull-down mode, a part of the plurality of first images may be hidden by the indicator. Further, if the position of the indicator is moved while the indicator is in a state of being in contact with or in proximity to the touch panel 20, in order to see the first image hidden by the indicator, a first case may occur in which the designated coordinates move to outside the display area of the list box image, or a second case may occur in which the designated coordinates enter a display area of another list box image. In the first case, in the pull-down mode, the display of the plurality of first images may end. Further, in the second case, in the pull-down mode, display contents of the plurality of first images may unintentionally be switched with contents related to the other list box image.

According to the operating system 21e described in the present specification, the plurality of first images can be displayed in the pull-down mode (S130) on the condition that the selection operation of the list box image is executed by the mouse 5 (S125: mouse). In the case where the selection operation of the list box image is executed by the mouse 5, the pointer image may be moved within the display area of the list box image, and consequently the list box image is not physically hidden by the indicator, etc. Therefore, selection of the first image can be performed more easily than in the case of utilizing the indicator. Further, in the case where the list box image was selected utilizing the mouse 5, the display mode which displays a first image showing choices in the pull-down mode is the mode that is generally utilized, and is highly familiar to users. Therefore, user convenience can be improved.

Furthermore, according to the operating system 21e described in present specification, the plurality of first images can be displayed in the pop-up mode (S135) on the condition that the selection operation of the list box image is executed by the touch panel 20 (S125: touch panel). Since the plurality of first images is displayed as popping out in the pop-up mode, it is possible to make the user not feel so discomfitted even if the plurality of first images is displayed at a location some distance from the list box image. Therefore, in case of utilizing the pop-up mode, the plurality of first images can be displayed at a position further from the list box image than in the case of utilizing the pull-down mode, consequently the situation can be prevented of the plurality of first images being hidden by the indicator. Further, in the case of utilizing the pop-up mode, it is possible to cause the user to recognize less of a relationship between the list box image and the plurality of first images than in the case of utilizing the pull-down mode. Consequently in the pop-up mode, in the first case in which the designated coordinates move to outside the display area of the list box image, it is possible to make the user not feel so discomfitted even without ending the display of the plurality of first images. Thereby, it can be made easier to select the first image in the case of performing the selection operation of the list box image by the touch panel 20, than by displaying the plurality of first images utilizing the pop-up mode.

Thus, according to the operating system 21e described in the present specification, operability can be improved by displaying the plurality of first images in a mode suitable for the user operation input method. Therefore, in case of an input system utilizing the mouse 5 and an input system utilizing the touch panel 20 coexisting, the situation can be prevented in which operability of the information processing device 10 deteriorates.

Second Embodiment

The second embodiment is a mode in which utilization of the pull-down mode or the pop-up mode is determined based on an input reception mode of a start command of the application program. Operation of the information processing device 10 of the second embodiment will be described utilizing the flowchart of FIG. 7. Moreover, contents of steps having the same reference numerals appended thereto in FIG. 7 as in FIG. 2 have already been described, and consequently a description thereof is omitted.

Figure 7:
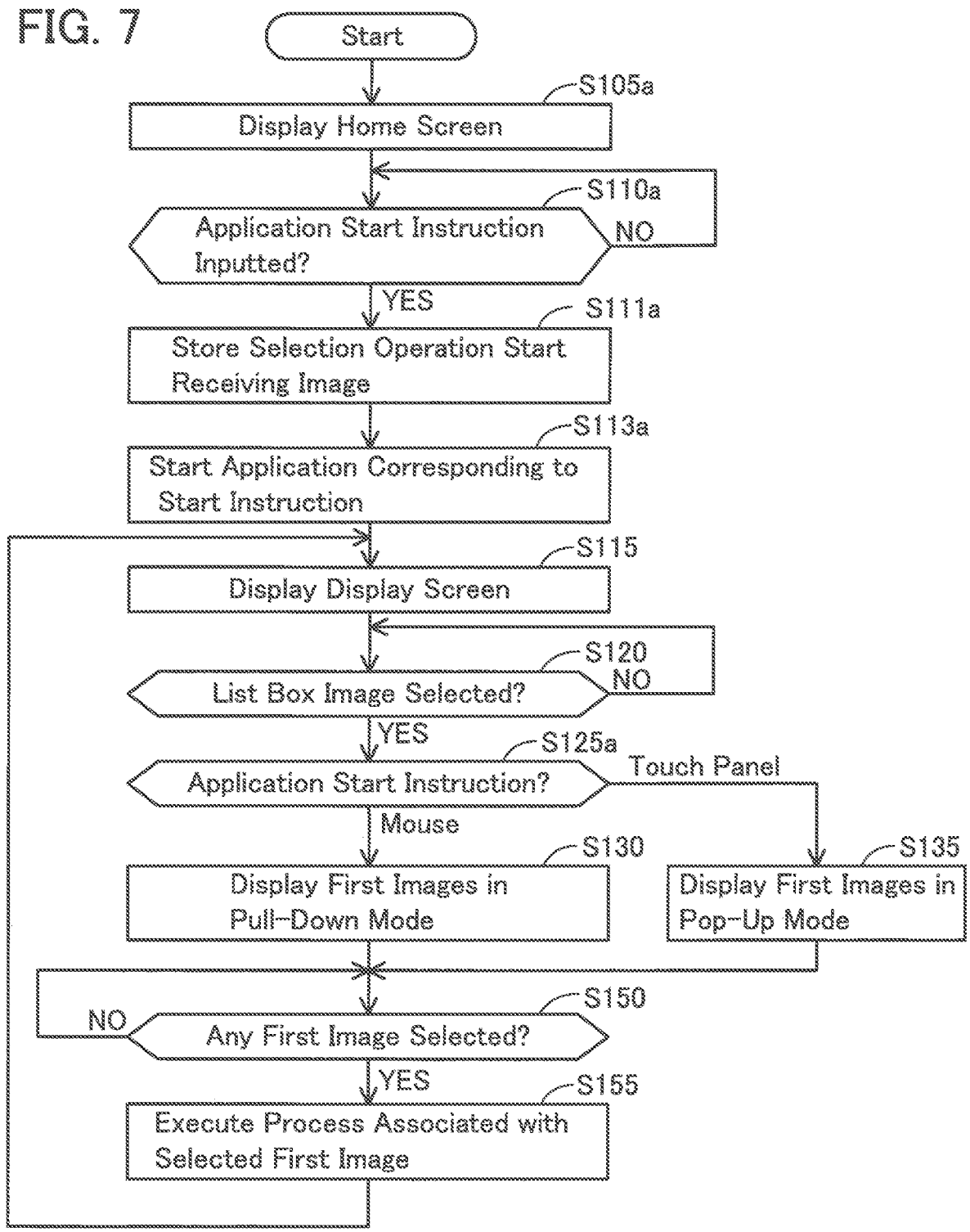
FIG. 7 is a diagram illustrating an operation flowchart of the information processing device of the second embodiment.

When the user inputs an operation via the button input unit 17 to start the information processing device 10, the flowchart of FIG. 7 is started. In S105a, the CPU 11 causes a home screen (not shown) to be displayed on the panel 18. A plurality of start receiving images, for receiving the input of an instruction to start each of the document creation application 31 to the browser application 33, may be included on the home screen. An icon image of the application is an example of the start receiving image.

In S110a, the CPU 11 determines whether the start instruction of any application has been input. The present determination may be performed based on whether an operation for selecting any one of the plurality of start receiving images has been received. In case of a negative determination (S110a: NO), processing returns to S110a, and in case of a positive determination (S110a: YES), processing proceeds to S111a.

In S111a, the CPU 11 stores, in the storage unit 12, whether a selection operation of the start receiving image was performed by either of the mouse 5 or the touch panel 20. For example, in a case where the start receiving image was selected by the mouse 5, a mouse start flag stored in the storage unit 12 may be set to "ON". In a case where the start receiving image was selected by the touch panel 20, a touch panel start flag stored in the storage unit 12 may be set to "ON".

In S113a, the CPU 11 starts the application corresponding to the start instruction input in S110a. Specifically, the CPU 11 reads the application corresponding to the selected start receiving image from among the document creation application 31 to the browser application 33. In S115, the CPU 11 displays a display screen including various object images on the panel 18 in response to completion of starting the application. In S120, the CPU 11 determines whether the list box image has been selected. In case of a negative determination (S120: NO), processing returns to S120, and in case of a positive determination (S120: YES), processing proceeds to S125a.

In S125a, the CPU 11 determines whether a start instruction for the application has been input by either the mouse 5 or the touch panel 20. The present determination may be performed by reading which flag, of the mouse start flag and the touch panel start flag stored in the storage unit 12, has been set to "ON".

In case of determining that a start operation has been performed by the mouse 5 (S125: mouse), processing proceeds to S130. In S130, the CPU 11 displays the plurality of first images in the pull-down mode, as illustrated in the display screen D2 of FIG. 4. On the other hand, in case of determining in S125 that a track operation has been performed by the touch panel 20 (S125: touch panel), processing proceeds to S135. In S135, the CPU 11 displays the plurality of first images in the pop-up mode, as illustrated in the display screen D4 of FIG. 6.

Effect of Second Embodiment

In the information processing device 10 capable of utilizing both the input system utilizing the mouse 5 and the input system utilizing the touch panel 20, the user can select which input system will be utilized primarily. In this case, operability may be reduced if a user interface is utilized which is not suitable for the input system that is primarily utilized. According to the operating system 21e described in the present specification, in the case where the operation for selecting the start receiving image for starting one application is received by the mouse 5 (S110a), it can be determined that the one application is to be operated primarily utilizing the mouse 5. Therefore, if the list box image is selected during operation of the one application, the plurality of first images can be displayed in the pull-down mode, which is suitable for the input system of the mouse 5 (S130). Further, in the case where the operation for selecting the start receiving image for starting one application is received by the touch panel 20 (S110a), it can be determined that the one application is to be operated primarily utilizing the touch panel 20. Therefore, if the list box image is selected during operation of the one application, the plurality of first images can be displayed in the pop-up mode, which is suitable for the input system of the touch panel 20 (S135).

Thus, according to the operating system 21e described in the present specification, an operation input for receiving the start instruction of the one application can also be applied as an operation input for determining the display mode of the plurality of first images. Thereby, a process specially to determine the display mode of the first images does not need to be performed separately, allowing operability for the user to be improved.

Third Embodiment

Figure 8:
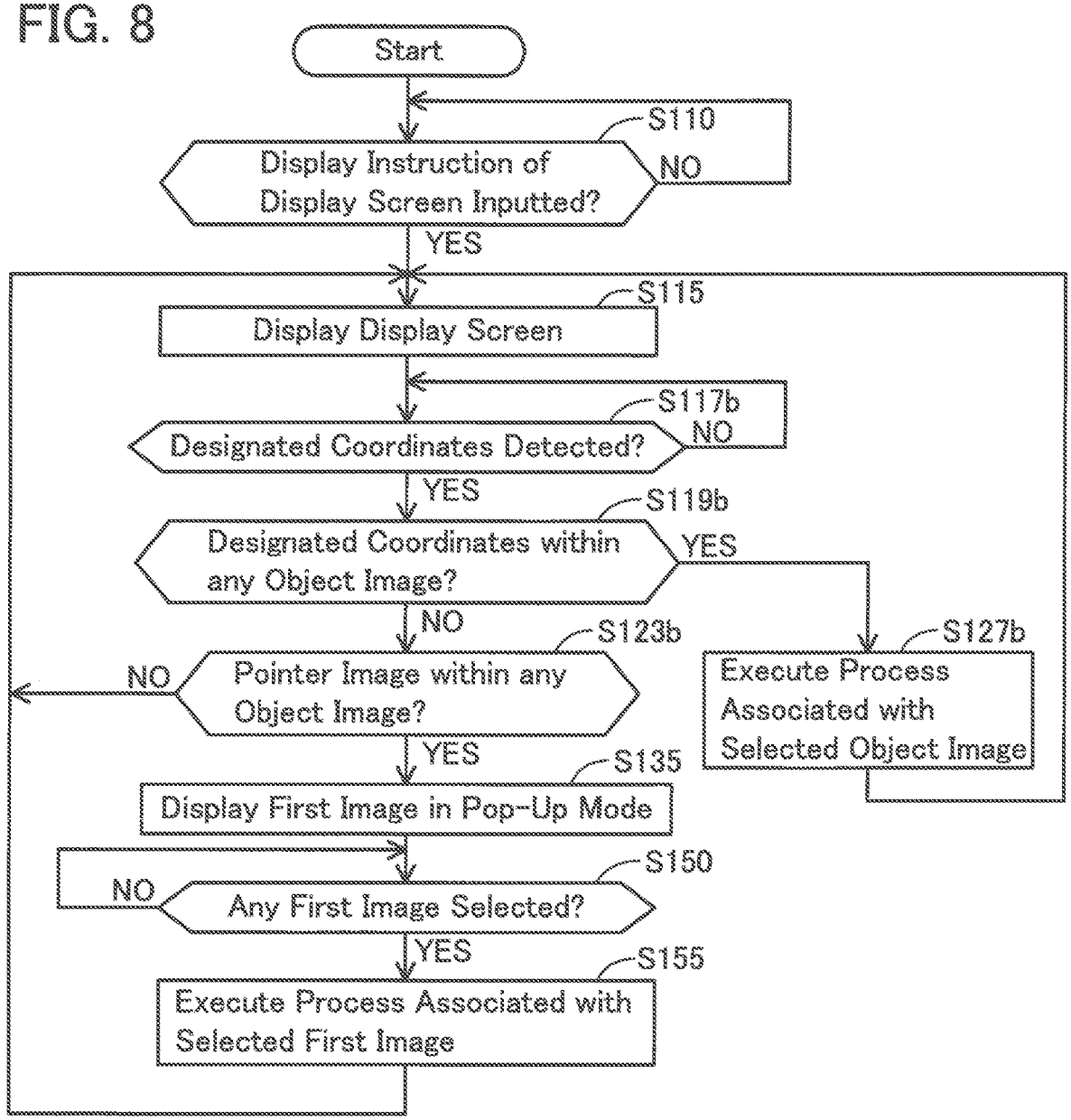
FIG. 8 is a diagram illustrating an operation flowchart of the information processing device of the third embodiment.

The third embodiment is a mode in which, in case a touch input is performed in a region other than the object image, an image associated with the region where the pointer image is positioned is displayed near the touch position. Operation of the information processing device 10 of the third embodiment will be described utilizing the flowchart of FIG. 8. Moreover, contents of steps having the same reference numerals appended thereto in FIG. 8 as in FIG. 2 have already been described, and consequently a description thereof is omitted.

Figure 9:
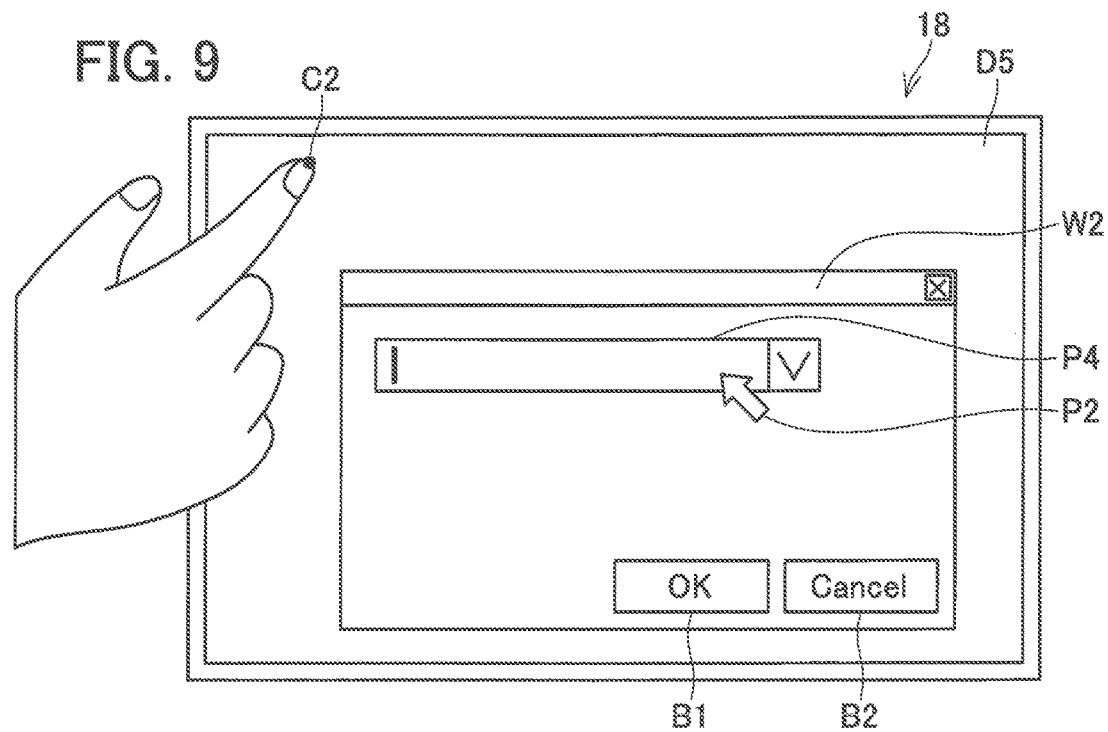
FIG. 9 is a diagram illustrating an example of a display screen.

In S115, the CPU 11 displays a display screen including various object images on the panel 18. FIG. 9 shows a display screen D5, which is an example of the display screen. A window image W2 is displayed in the display screen D5. A text box image P4, the pointer image P2, the OK button image B1, and the cancel button image B2 are included in the window image W2. The text box image P4 is an image for receiving input of text information which indicates a character string.

In S117b, the CPU 11 determines whether designated coordinates have been detected within the display area of the touch panel 20. In case of a negative determination (S117b: NO), processing returns to S117b, and in case of a positive determination (S117b: YES), processing proceeds to S119b.

In S119b, the CPU 11 determines whether the detected designated coordinates are within the display area of any object image. In case of a positive determination (S119b: YES), it is determined that the object image has been selected, and processing proceeds to S127b. In S127b, the CPU 11 executes a process associated with the selected object image. Then, processing returns to S115.

On the other hand, in case of a negative determination in S119b (S119b: NO), processing proceeds to S123b. A specific case of the negative determination in S119b is a case of detecting designated coordinates C2 within a region in which no object image is displayed, as shown in the display screen D5 of FIG. 9.

In S123b, the CPU 11 determines whether the pointer image is in a state of being displayed within the display area of any object image. In case of a negative determination (S123b: NO), processing returns to S115. On the other hand, in case of a positive determination (S123b: YES), processing proceeds to S135. A specific case of the positive determination is a case of the pointer image P2 being detected within a display area of the text box image P4, as shown in the display screen D5 of FIG. 9.

In S135, the CPU 11 displays a plurality of second images in the pop-up mode. At this time, the display contents of the plurality of second images are contents corresponding to the type of object images to which the pointer image P2 is pointing. Based on the designated coordinates detected in S117b, the plurality of second images may be displayed in the vicinity of the designated coordinates.

Figure 10:
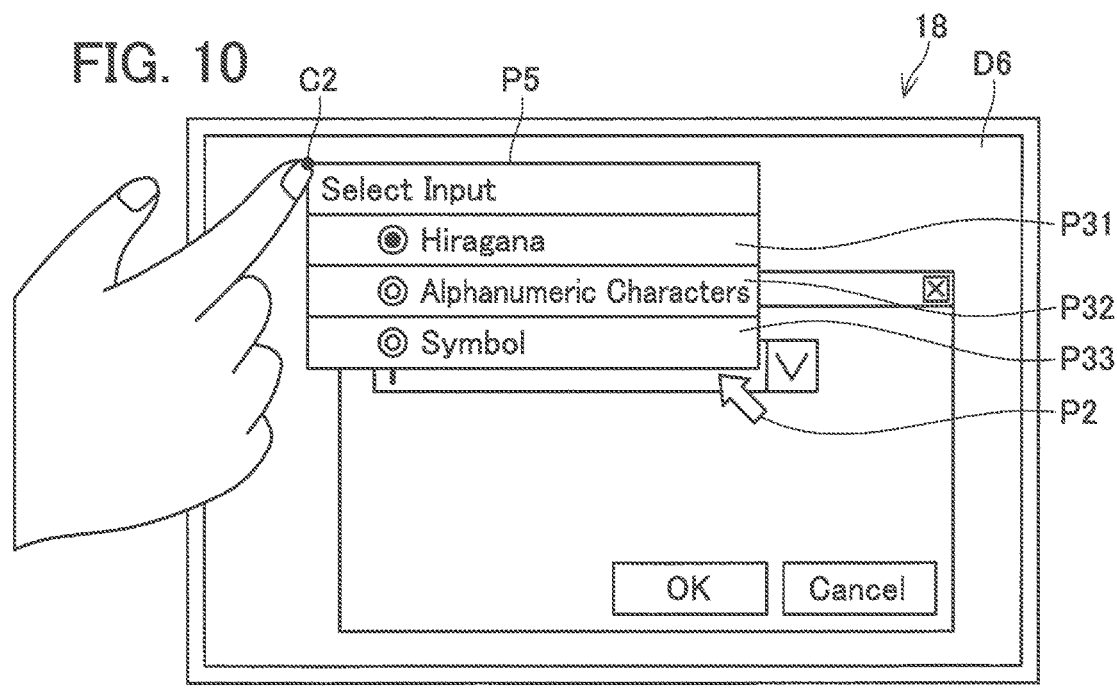
FIG. 10 is a diagram illustrating an example of a display screen.

FIG. 10 shows a display screen D6 which is displaying the second images in the pop-up mode. In the display screen D6, a pop-up image P5 is displayed as popping out in the vicinity of the designated coordinates C2. Display contents of second images P31 to P33 included in the pop-up image P5 are display contents corresponding to the type of object images to which the pointer image P2 is pointing (the text box image P4 in the present illustrative example). Specifically, the display contents of the second images P31 to P33 are contents for selecting text type when text information is to be input to the text box image P4. Then, processing proceeds to S150.

In S150, the CPU 11 determines whether any of the second images has been selected. In case of a negative determination (S150: NO), processing returns to S150, and in case of a positive determination (S150: YES), processing proceeds to S155.

In S155, the CPU 11 executes a process associated with the selected second image. Specifically, a text type which is associated with the selected second image is utilized as the text type when text information is to be input to the text box image P4. Then, processing returns to S115.

Effect of Third Embodiment

It may be necessary to change the text type during the period in which the text information is being input into the text box. In the case of using only the mouse 5 as the input system, it is necessary to move the pointer image from the text box image to a specific object image to select the text type and then, after selecting the specific object image to select the text type, to move the pointer image back to the text box image, and to select the text box image as the input target of the text information.

According to the operating system 21e described in the present specification, as illustrated in the specific examples of FIG. 9 and FIG. 10, the text box image P4 can be selected as the input target of the text information by moving the pointer image P2 to the display area within the text box image P4. Then, by utilizing the button input unit 17, text information can be input into the text box image P4. To change the text type, it is sufficient to touch a region in the display screen D5 shown in FIG. 9 which does not have any object image displayed therein. Thereby, as in the display screen D6 shown in FIG. 10, the pop-up image P5 is displayed, and consequently the change of text type can be performed. Even after the text type has been changed, the pointer image P2 is positioned within the display area of the text box image P4, and consequently the state is maintained in which the text box image P4 is selected as the input target of the text information. Therefore, the process of inputting the text information to the text box image P4, utilizing the text type after changing, can be resumed immediately. Thus, the operation of specifying the input target of the text information, and the operation of setting the type, etc. of the text information can be assigned to each of the mouse 5 and the touch panel 20. Therefore, the movement distance of the pointer image can be made shorter in the operation of specifying the input target of the text information, and the operation of setting the type, etc. of text information than in the case where only the one input system using the mouse 5 is received, allowing operability for the user to be improved.

Fourth Embodiment

Figure 11:
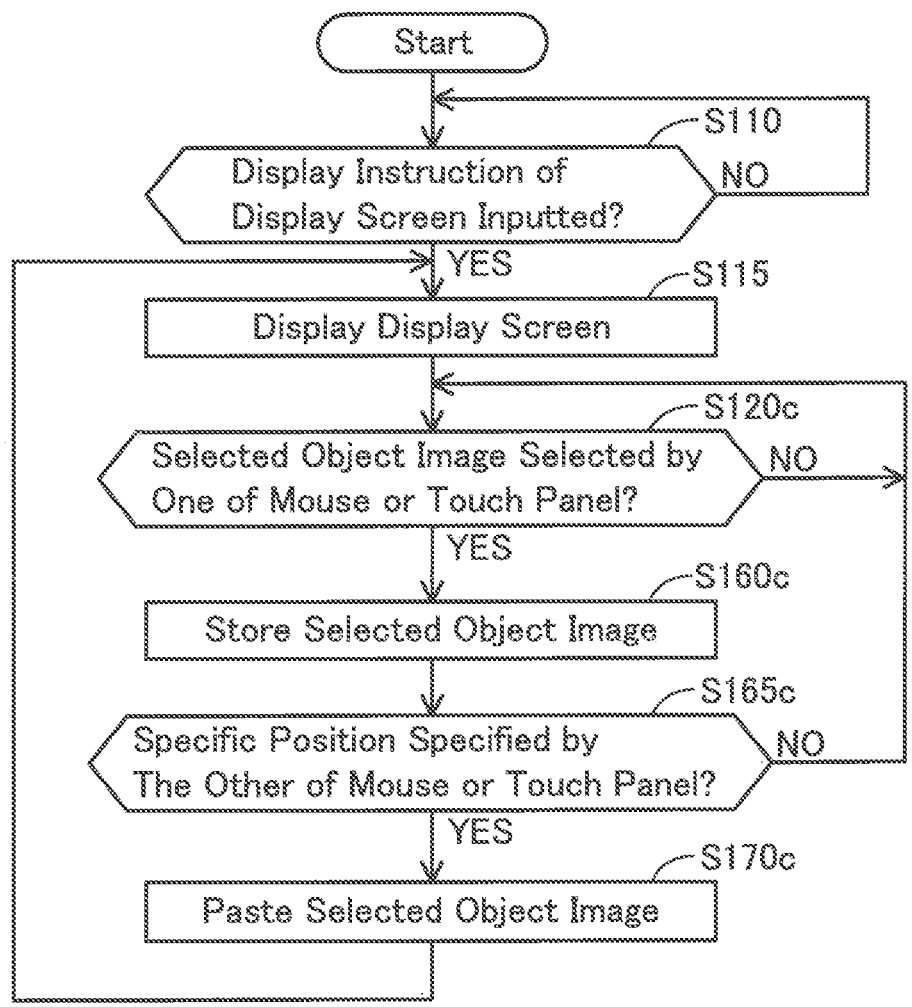
FIG. 11 is a diagram illustrating an operation flowchart of the information processing device of the fourth embodiment.

The fourth embodiment is a mode in which a pair of mutually differing operation contents is each assigned to differing input systems which utilize the mouse 5 and the touch panel 20. Operation of the information processing device 10 of the fourth embodiment will be described utilizing the flowchart of FIG. 11. Moreover, contents of steps having the same reference numerals appended thereto in FIG. 11 as in FIG. 2 have already been described, and consequently a description thereof is omitted.

In S120*c*, the CPU 11 determines whether a selected object image has been selected by either one of the mouse 5 or the touch panel 20. The selected object image is an object image selected by the user from object images that are being displayed on the display screen. Examples of the selected object image are a character string selected by a drag operation, various images selected by a click operation, etc. In S160*c*, the CPU 11 temporarily stores the selected object image in the storage unit 12.

In S165*c*, after the process of storing the selected object image has been performed, the CPU 11 determines whether the operation of specifying the specific position in the touch panel 20 was input by the other one from among the mouse 5 and the touch panel 20 (i.e., by the input system differing from the input system utilized in S120*c*). In case of a negative determination (S165*c*: NO), processing returns to S120*c*, and in case of a positive determination (S165*c*: YES), processing proceeds to S170*c*.

In S170*c*, the CPU 11 executes a process for pasting the selected object image on the basis of the specific position. Then, processing returns to S115.

Effect of Fourth Embodiment

In a case where the operation of selecting and storing the selected object image, and the operation of pasting the stored selected object image in the specific position is performed using only one of the mouse 5 or the touch panel 20, it is necessary to move the pointer image or the indicator to the position of the selected object image and select the selected object image, and then to move the pointer image or the indicator to the specific position and specify the specific position. According to the operating system 21*e* described in the present specification, the operation of selecting and storing the selected object image, and the operation of pasting the stored selected object image in the specific position can be assigned to each of the input system utilizing the mouse 5 and the input system utilizing the touch panel 20. Thereby, it is not necessary to move the pointer image or the indicator between the position of the selected object image and the specific position. Thus, the movement distance of the pointer image or the indicator can be made shorter in the operation of selecting and storing the selected object image, and the operation of pasting the stored selected object image in a specific position than in the case where only one input system is received, allowing operability for the user to be improved.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

Modified Embodiments

In S135 of the third embodiment, the display contents of the plurality of second images is not restricted to contents for selecting the text type, but may be e.g., contents for selecting size or font type of the input character strings.

In the fourth embodiment, in S160*c* it may be possible to receive a plurality of selections of the selection object image. The one selected object image which was most recently selected may be stored temporarily in the storage unit 12. In S170*c*, a process may be performed for pasting the one selected object image which was most recently selected. Thereby, even in case of selecting a plurality of selected object images in S160*c*, the user does not need to perform selection for whether to paste any selected object image. Therefore, operability for the user can be improved.

The selected object image which is selected in S120*c* of the fourth embodiment may be a character string selected by a drag operation of the mouse 5. The specific position which is specified in S165*c* may be designated coordinates input by the touch panel 20. The pointer image is utilized in the case where the character string is selected by the drag operation of the mouse 5, and consequently the screen is not physically hidden by the indicator. By using a combination in which the operation for selecting the character string is assigned to the mouse 5 and the operation for specifying the pasting position is assigned to the touch panel 20, it becomes possible for the character string to be selected in the drag operation performed by the mouse 5. Since the pointer image is utilized with the mouse 5, the screen is not physically hidden by the indicator, and it becomes possible to perform the selection while reliably performing a visual check of the character string that is the selection target. Thereby, operability at the time of selecting the selection object image can be improved.

The manner of display of the display screens shown FIGS. 3 to 6, FIG. 9, and FIG. 10 are examples, and other display modes may also be utilized. The list box image is not restricted to the manner shown in FIG. 4.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives.

Each program may be constituted by a single program module or by a plurality of program modules. Each example may adopt another replaceable configuration which is within the context of the present invention. Adoptable configurations include a computer (the CPU 11 or the like) which executes processing based on a program (the document creation application 31 or the like), a computer which executes processing based on a program other than an image processing program such as an operating system and other applications, a hardware configuration (the panel 18 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable recording medium which stores computer-readable instructions for an information processing device, the information processing device comprising:
a processor;
a pointing device; and
a display,
the computer-readable instructions, when executed by the processor, causing the information processing device to:
display a pointer on the display in accordance with pointer position information indicating a moving direction and a moving amount of the pointer, the pointer position information being inputted from the pointing device;
receive a first selection of an image in accordance with image selection information inputted from the pointing device, the image selection information indicating that the image corresponding to a displayed position of the pointer has been selected;
receive a second selection of an image corresponding to a designated coordinate by detecting the designated coordinate that is a coordinate indicating a position where an indicator made contact or approached within a display region of the display;
display a first object image on the display for receiving an input of an instruction to display a plurality of first images on the display, each of the plurality of first images having a function associated thereto, each of the plurality of first images being related to the first object image such that one of the functions associated to the first images is actually chosen by selecting one of the plurality of first images after the first object image has been selected;
determine whether an operation to select the displayed first object image is received in the first selection by the pointing device or in the second selection by the indicator,
display the plurality of first images related to the first object image at a first position of the display in a pull-down mode in a case where it is determined that an operation to select the displayed first object image is received in the first selection, the first position at which the plurality of first images is displayed being defined with a lower end of the first object image as a position reference and being below the first object image and an upper end of the plurality of first images contacting with the lower end of the first object image, and
at a second position of the display different from the first position in a pop-up mode in a case where it is determined that an operation to select the displayed first object image is received in the second selection, the second position at which the plurality of first images is displayed being above the first object image such that the plurality of first images is not hidden by the indicator located below the first object image, the pull-down mode displaying the plurality of first images so as to pull out the plurality of first images from a displayed position of the first object image, the first position of the first images being different from the displayed position of the first object image, the pop-up mode displaying the plurality of first images so as to pop out the plurality of first images, and the second position of the first images being different from the displayed position of the first object image; and
execute, in a case where a selection of a first image among the plurality of displayed first images is received, the process associated with the selected first image, wherein
a first distance between the first images displayed at the second position and the first object is greater than a second distance between the first images displayed at the first position and the first object image, and
the first images displayed at the first position and the first images displayed at the second position partially overlap or do not overlap.

2. The non-transitory computer-readable recording medium as in claim 1, wherein
the information processing device is configured capable of installing an application program for displaying the first object image on the display, and
the computer-readable instructions further cause the information processing device to:
display a second object image on the display for receiving an input of an instruction to activate the installed application program;
activate the installed application program in a case where an operation to select the displayed second object image is received in the first selection or the second selection; and
display the plurality of first images on the display in a case where an operation to select the first object image displayed by the activated application program is received in the first selection or the second selection,
wherein
the plurality of first images is displayed in the pull-down mode in a case where the operation to select the second object image is received in the first selection, and
the plurality of first images is displayed in the pop-up mode in a case where the operation to select the second object image is received in the second selection.

3. The non-transitory computer-readable recording medium as in claim 1, wherein
the plurality of first images is displayed at the second position such that the situation is prevented of the plurality of first images being hidden by the indicator.

4. The non-transitory computer-readable recording medium as in claim 1, wherein
the first images displayed at the first position and the first images displayed at the second position completely do not overlap.

5. The non-transitory computer-readable recording medium as in claim 1, wherein
the pull-down mode displays the plurality of first images with the first object image being a reference position.

6. The non-transitory computer-readable recording medium as in claim 1, wherein
the first object image is a list box image.

7. The non-transitory computer-readable recording medium as in claim 1, wherein
the pointing device is a mouse, and
the display is a touch panel.

8. The non-transitory computer-readable recording medium as in claim 1, wherein
the second position is above the position where the indicator made contact or approached within the display region.

9. The non-transitory computer-readable recording medium as in claim 1, wherein
the first object image is a text box image; and
display contents of the plurality of first images are contents for selecting text type when text information is to be input to the first object image.

10. A non-transitory computer-readable recording medium which stores computer-readable instructions for an information processing device,
the information processing device comprising:
a processor;
a pointing device; and
a display,
the computer-readable instructions, when executed by the processor, causing the information processing device to:
display a pointer on the display in accordance with pointer position information indicating a moving direction and a moving amount of the pointer, the pointer position information being inputted from the pointing device;
receive a first selection of an image in accordance with image selection information inputted from the pointing device, the image selection information indicating that the image corresponding to a displayed position of the pointer has been selected;
receive a second selection of an image corresponding to a designated coordinate by detecting the designated coordinate that is a coordinate indicating a position where an indicator made contact or approached within a display region of the display;
display a first object image on the display for receiving an input of an instruction to display a plurality of first images on the display, each of the plurality of first images having a function associated thereto, each of the plurality of first images being related to the first object image such that one of the functions associated to the first images is actually chosen by selecting one of the plurality of first images after the first object image has been selected;
determine whether an operation to select the displayed first object image is received in the first selection by the pointing device or in the second selection by the indicator,
display, the plurality of first images related to the first object image at a first position of the display on the display in a case where it is determined that an operation to select the displayed first object image is received in the first selection, the first position at which the plurality of first images is displayed being defined with a lower end of the first object image as a position reference and being below the first object image and an upper end of the plurality of first images contacting with the lower end of the first object image,
and at a second position of the display different from the first position in a case where it is determined that an operation to select the displayed first object image is received in the second selection, the second position at which the plurality of first images is displayed being above the first object image such that the plurality of first images is not hidden by the indicator located below the first object image, the first position of the first images being different from the displayed position of the first object image, and the second position of the first images being different from the displayed position of the first object image; and
execute, in a case where a selection of a first image among the plurality of displayed first images is received, the process associated with the selected first image, wherein
a first distance between the first images displayed at the second position and the first object image is greater than a second distance between the first images displayed at the first position and the first object image,
the first images displayed at the first position and the first images displayed at the second position partially overlap or do not overlap.

11. The non-transitory computer-readable recording medium as in claim 10, wherein
the information processing device is configured capable of installing an application program for displaying the first object image on the display, and
the computer-readable instructions further cause the information processing device to:
display a second object image on the display for receiving an input of an instruction to activate the installed application program;
activate the installed application program in a case where an operation to select the displayed second object image is received in the first selection or the second selection; and
display the plurality of first images on the display in a case where an operation to select the first object image displayed by the activated application program is received in the first selection or the second selection,
wherein
the plurality of first images is displayed at the first position in a case where the operation to select the second object image is received in the first selection, and
the plurality of first images is displayed at the second position in a case where the operation to select the second object image is received in the second selection.

12. The non-transitory computer-readable recording medium as in claim 10, wherein
the plurality of first images is displayed at the second position such that the situation is prevented of the plurality of first images being hidden by the indicator.

13. The non-transitory computer-readable recording medium as in claim 10, wherein
the first images displayed at the first position and the first images displayed at the second position completely do not overlap.

14. The non-transitory computer-readable recording medium as in claim 10, wherein
the first object image is a list box image.

15. The non-transitory computer-readable recording medium as in claim 10, wherein
the pointing device is a mouse, and
the display is a touch panel.

16. The non-transitory computer-readable recording medium as in claim 10, wherein
the first object image is a text box image; and display contents of the plurality of first images are contents for selecting text type when text information is to be input to the first object image.

\* \* \* \* \*